US006325169B1

(12) United States Patent
Tateshima et al.

(10) Patent No.: US 6,325,169 B1
(45) Date of Patent: Dec. 4, 2001

(54) MOTORCYCLE AND MOTORCYCLE AIR CLEANER SYSTEM

(75) Inventors: Yoshinobu Tateshima; Yuichi Kato, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/578,688

(22) Filed: May 26, 2000

(30) Foreign Application Priority Data

May 27, 1999 (JP) ................................................ 11-148853

(51) Int. Cl.$^{7}$ ................................................ B62D 61/02

(52) U.S. Cl. ........................................... 180/219; 55/385.3

(58) Field of Search .................................... 180/219, 229, 180/68.1, 68.3

(56) References Cited

U.S. PATENT DOCUMENTS 4,402,379 * 9/1983 Hoshi .................................. 180/225
4,412,596 * 11/1983 Pudil et al. .......................... 180/227
4,637,486 * 1/1987 Iwai .................................... 180/225
4,694,924 * 9/1987 Asakura et al. .................... 180/68.3
4,815,554 * 3/1989 Hara et al. .......................... 180/219
4,996,471 * 2/1991 Hara et al. .......................... 180/219
5,183,130 * 2/1993 Nakamura et al. .................. 180/219
5,211,255 * 5/1993 Fukuda ................................ 180/219
5,261,504 * 11/1993 Katsura ............................... 180/219

FOREIGN PATENT DOCUMENTS

B2-6236909 8/1987 (JP) .

* cited by examiner

*Primary Examiner*—J. J. Swann
*Assistant Examiner*—L. Lum

(57) ABSTRACT

A motorcycle air cleaner system arranged behind a rear suspension damper. A connecting tube extends from an outlet in an air cleaner so that air for combustion flows sequentially through the air cleaner and the connecting tube. A front surface of the air cleaner is brought close to the rear suspension damper by providing a recessed section for providing clearance for the rear suspension damper. An expanded portion of the connecting tube adjacent the recessed section increases the capacity of the air cleaner.

16 Claims, 5 Drawing Sheets

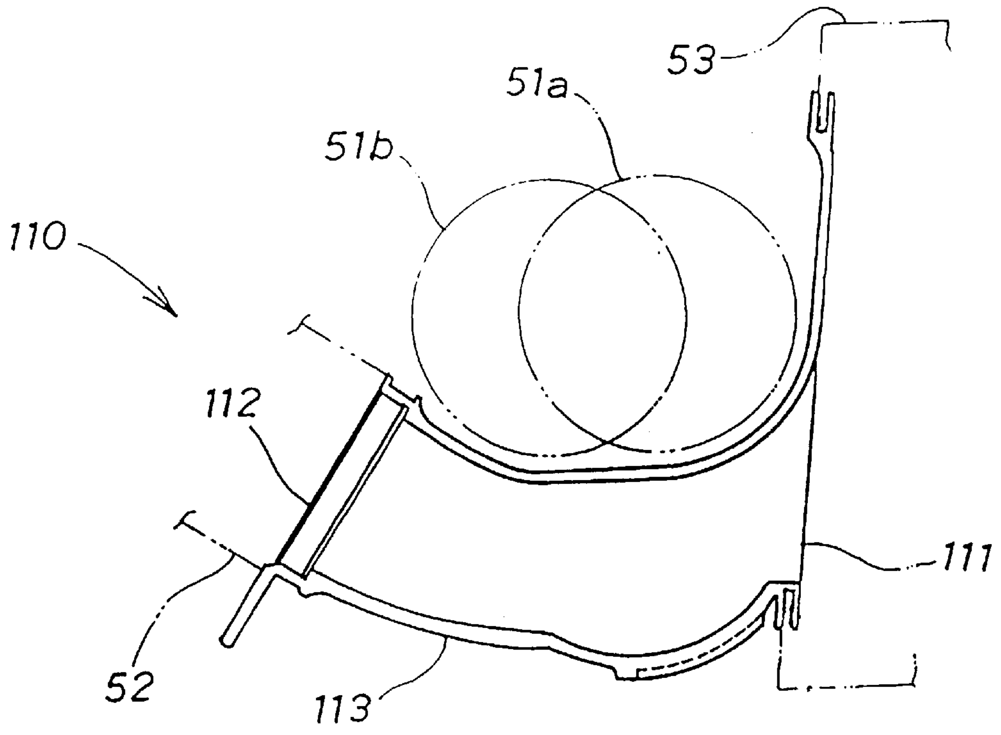
Fig. 5(a) comparative example
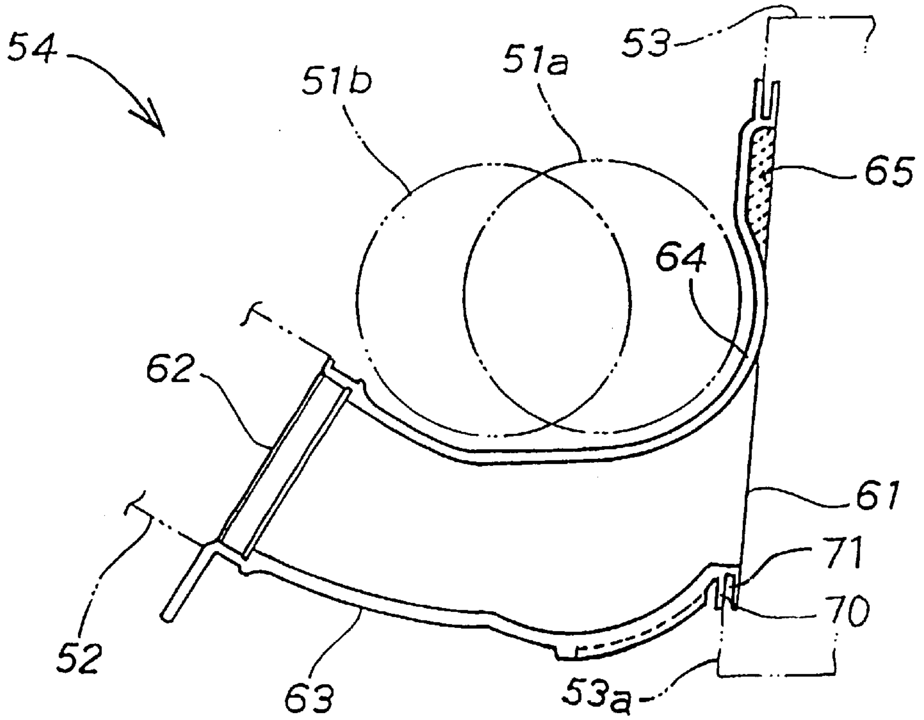
Fig. 5(b) embodiment

MOTORCYCLE AND MOTORCYCLE AIR CLEANER SYSTEM

BACKGROUND OF THE INVENTION

1. Field of the Invention

The present invention relates to a motorcycle air cleaner system.

2. Background Art

FIG. 6 of the present application is a side elevation of a conventional air cleaner system. Fr represents the front of a vehicle body and Rr represents the rear of the vehicle body.

As shown in FIG. 6, a conventional motorcycle air cleaner system 100 has a single rear suspension damper 101 arranged close to the center of the vehicle body, a carburetor 102 arranged in front of the rear suspension damper 101, an air cleaner 103 arranged behind the rear suspension damper 101, and a connecting tube 104 connecting the carburetor 102 and the air cleaner 103. A front surface 103*a* of the air cleaner 103 is positioned substantially parallel to an axial line A of the rear suspension damper 101. The suspension damper 101 is moved backwards when fully compressed. Reference numeral 105 represents a main frame, reference numeral 106 represents a seat rail, and reference numeral 107 represents a subframe.

With the above structure, the connecting tube connecting the carburetor 102 and the air cleaner 103 is long, which has a detrimental effect on the performance of the engine. Also, the rear suspension damper 101 moves in the longitudinal direction of the vehicle, which means that the air cleaner 103 is positioned so that the rear suspension damper 101 can move. Accordingly, the capacity of the air cleaner is restricted, which lowers engine output.

An example of a motorcycle air cleaner system that shortens the connecting tube and also contributes to the capacity of the air cleaner is disclosed in Japanese Patent Publication No. Sho. 62-36909, entitled "Air Cleaner Assembly for Motorcycle."

As shown in FIG. 1 and FIG. 2 of that publication, an engine 14 is attached to a vehicle frame 10 (the reference numerals used in that publication will be used in this description). Carburetors 32, 32 are attached to the engine 24, an air chamber 30 is attached to the carburetors 32, 32 through connecting tubes 31, 31, and an air cleaner 33 is attached to the air chamber 30 through passages 44, 44, bypassing a shock absorber 22.

By this arrangement, a large quantity of air is drawn by an air retaining function of the air chamber 30. However, the air chamber 30 is arranged between the air cleaner 33 and the connecting tube, causing an increase in the number of components.

Also, because the air chamber 30 is positioned around the shock absorber 22, the structure becomes complicated and inspection and repair of the motorcycle is difficult.

It is therefore an object of the present invention to provide a motorcycle air cleaner system that can contribute to the capacity of an air cleaner without increasing the number of components and without a complicated structure.

SUMMARY OF THE INVENTION

In order to achieve the above described object and other objects, the present invention is directed to a motorcycle air cleaner system provided on a motorcycle having a single rear suspension damper close to the center of the vehicle body. An air cleaner is arranged behind the rear suspension damper, and a connecting tube extends from an outlet of the air cleaner so that air for combustion flows sequentially through the air cleaner and the connecting tube. A front surface of the air cleaner is brought close to the rear suspension damper by providing a recessed section for housing the rear suspension that moves backwards when fully compressed.

A single rear suspension damper is arranged close to the center of the vehicle body, an air cleaner is arranged behind the rear suspension damper, and a connecting tube extends from an outlet of the air cleaner so that air for combustion flows sequentially through the air cleaner and the connecting tube.

A front surface of the air cleaner is allowed to be close to the rear suspension damper by providing a recessed section for housing the rear suspension, which moves backwards when fully compressed.

The recessed section is provided so as to extend into the air cleaner. Because of the recessed section, the connecting tube need not extend outwardly excessively, which shortens the path between the air cleaner and the carburetor, and increases engine performance.

In addition, a portion of the connecting tube can be expanded outwardly from the air cleaner, increasing the effective capacity of the air cleaner, and thereby increasing engine performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING FIGURES

The present invention will become more fully understood from the detailed description given hereinbelow and the accompanying drawings which are given by way of illustration only, and thus are not limitative of the present invention, and wherein:

FIG. 5 illustrates the operation of the present invention; and

DETAILED DESCRIPTION OF THE PREFERRED EMBODIMENTS

Figure 1:
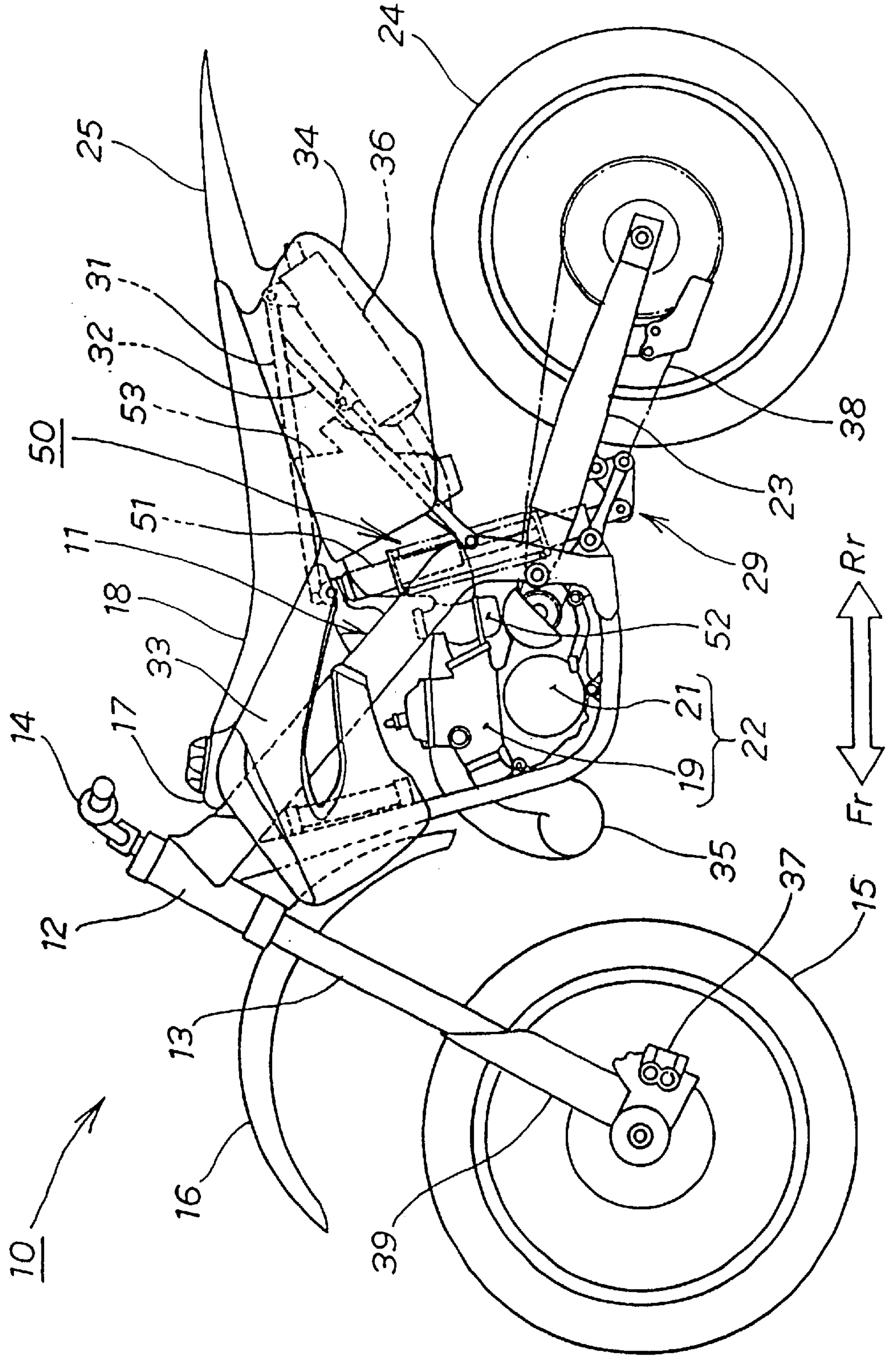
FIG. 1 is a side elevational view of a motorcycle having an air cleaner system according to the present invention.

FIG. 1 is a side elevation of a motorcycle having an air cleaner system for a motorcycle to which the present invention relates. Fr represents the front of the vehicle and Rf represents the rear of the vehicle.

A motorcycle 10 is an off-road bike, and comprises a vehicle frame 11, a head pipe provided at a front part of the vehicle frame 11, front forks 13, 13 (the inner side fork 13 is not shown) rotatably attached to the head pipe 12, a handlebar 14 attached to an upper part of these front forks 13, 13, a front wheel 15 rotatably attached to a lower part of the front forks 13, 13, a front fender 16 covering the front wheel, a fuel tank 17 attached to the vehicle frame 11 behind the head pipe 12, a seat 18 provided above the fuel tank 17, a power unit 22 made up of an engine 19, and a transmission 21 arranged below the fuel tank 17 and the seat 18. A swingarm 23 is attached to the vehicle frame 11 behind the power unit 22 so as to be capable of swinging, a rear wheel 24 is rotatably attached to the swingarm 23 and is driven by the power unit 22, and a rear fender 35 is attached to an upper part of the rear wheel 24.

Reference numeral 29 represents a linkage interposed between the swingarm 23 and a rear suspension damper 51, reference numeral 31 represents a seat rail, reference numeral 32 represents a subframe, reference numeral 33 represents a radiator shroud, reference numeral 34 represents a seat cowl, reference numeral 35 represents an exhaust pipe, reference numeral 36 represents a silencer, reference numeral 37 represents a caliper, reference numeral 38 represents a drive chain, reference numeral 39 represents a protector, and reference numeral 50 represents an air cleaner system for a motorcycle (hereinafter abbreviated to air cleaner system 50).

Figure 2:
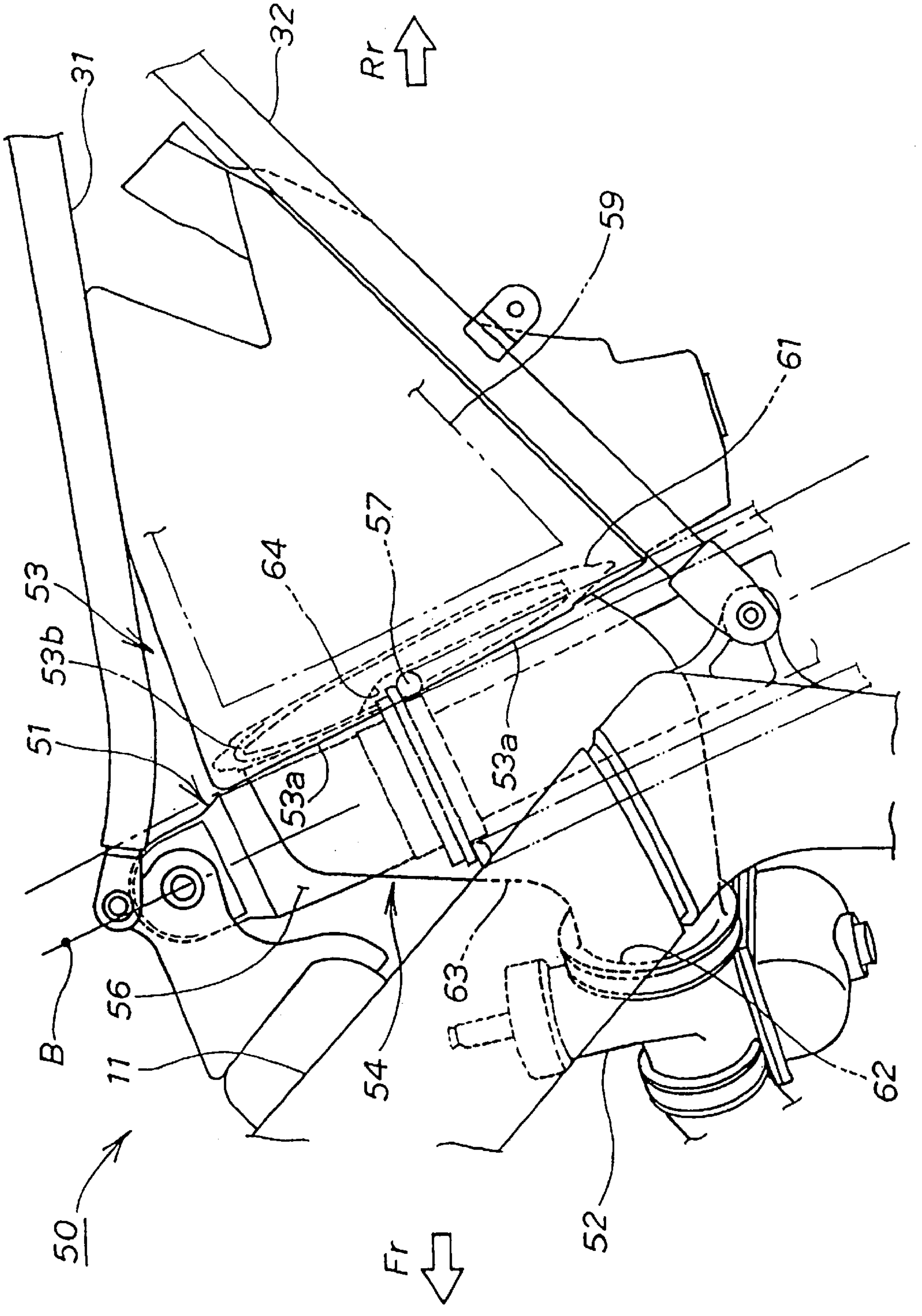
FIG. 2 is a side elevation of an air cleaner system according to the present invention.

FIG. 2 is a side elevational view of an air cleaner system according to the present invention.

The air cleaner system 50 has a single rear suspension damper 51 arranged close to the center of the vehicle, a carburetor 52 is arranged in front of this rear suspension damper 51, an air cleaner 53 is arranged behind the rear suspension damper 51, and a connecting tube 54 is arranged between the carburetor 52 and the air cleaner 53. A front surface 53*a* of the air cleaner 53 is made to slant forward (from a bottom edge to a top edge) with respect to an axial line B of the rear suspension damper 51. The rear suspension damper retracts when fully compressed. Reference numeral 64 represents a recessed section formed in the connecting tube 54.

The rear suspension damper 51 is provided with a damper section at its inner side, and a damper spring 57 outside the damper section 56. An upper end of the rear suspension damper 51 is stopped by the vehicle frame 11 and a lower end is connected to the swingarm 23 through the linkage 29 shown in FIG. 1.

The rear suspension damper 51 moves forward when it is being stretched and move backwards when it is being compressed. In other words, the rear suspension damper sways. The air cleaner system 50 fixes the location of the air cleaner 53 in part dependent upon the position of the rear suspension damper 51 when it is compressed.

The carburetor 52 mixes fuel from the fuel tank 17 shown in FIG. 1 and air flowing from the air cleaner 53 side, and supplies vaporized fuel to the engine 19.

The air cleaner 53 has an air filter housed inside, and purifies air to be sent to the carburetor 52. Reference numeral 53*a* represents a front surface of the air cleaner 53, and reference numeral 53*b* represents an outlet of the air cleaner 53.

The air cleaner system 50 has a single rear suspension damper 51 arranged close to the center of the vehicle body, an air cleaner 53 arranged behind the rear suspension damper 51, and a connecting tube 54 extending from an outlet of the air cleaner 53, so that air for combustion flows sequentially through the air cleaner 53 and the connecting tube 54. Also, a front surface 53*a* of the air cleaner 53 is brought close to the rear suspension damper 51 by providing a recessed section 64 for housing the rear suspension damper 51. The rear suspension damper 51 moves backwards when it is fully compressed. The front surface 53*a* of the air cleaner 53 to slopes forwardly from a bottom edge to a top edge.

That is, a recessed section 64 for housing the rear suspension damper 51 is provided in the connecting tube 54, and the front surface 53*a* of the air cleaner 53 is caused to slope forwards close to the rear suspension damper 51, which means that it is possible to shorten the connecting tube 54 and it is possible to improve engine performance.

Figure 3:
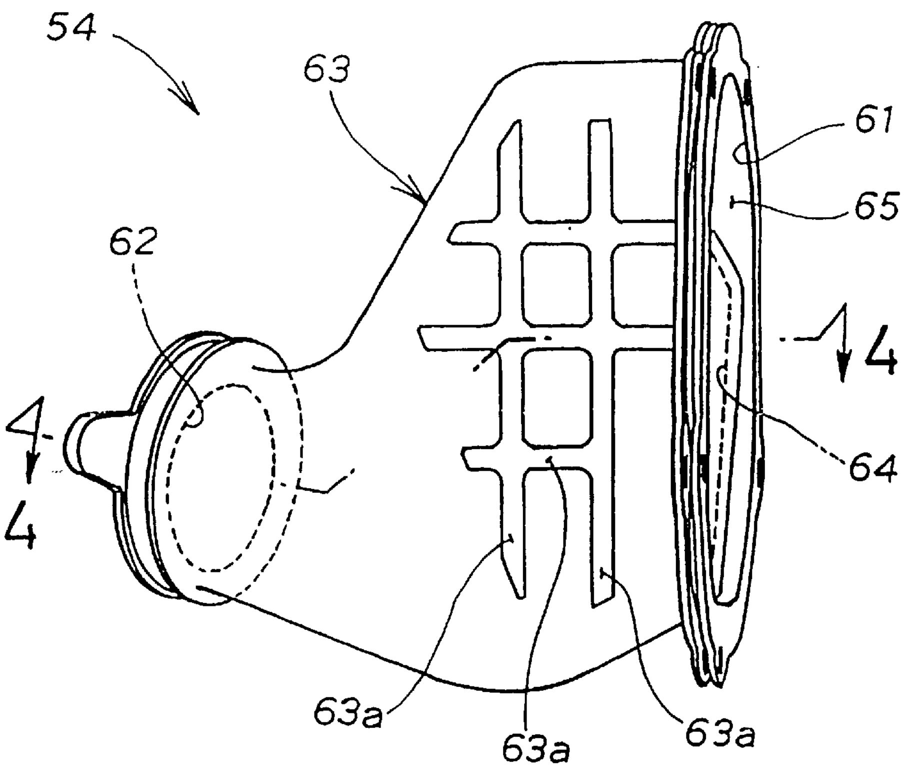
FIG. 3 is a side elevational view of a connecting tube of an air cleaner system according to the present invention.
Figure 4:
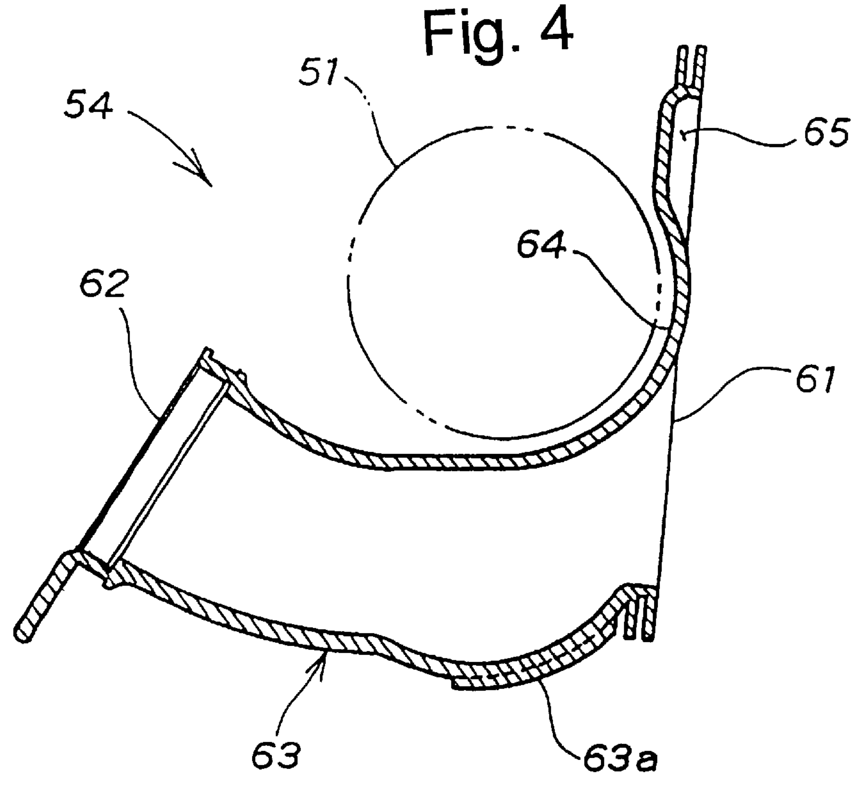
FIG. 4 is a cross section along line 4—4 in FIG. 3.
Figure 6:
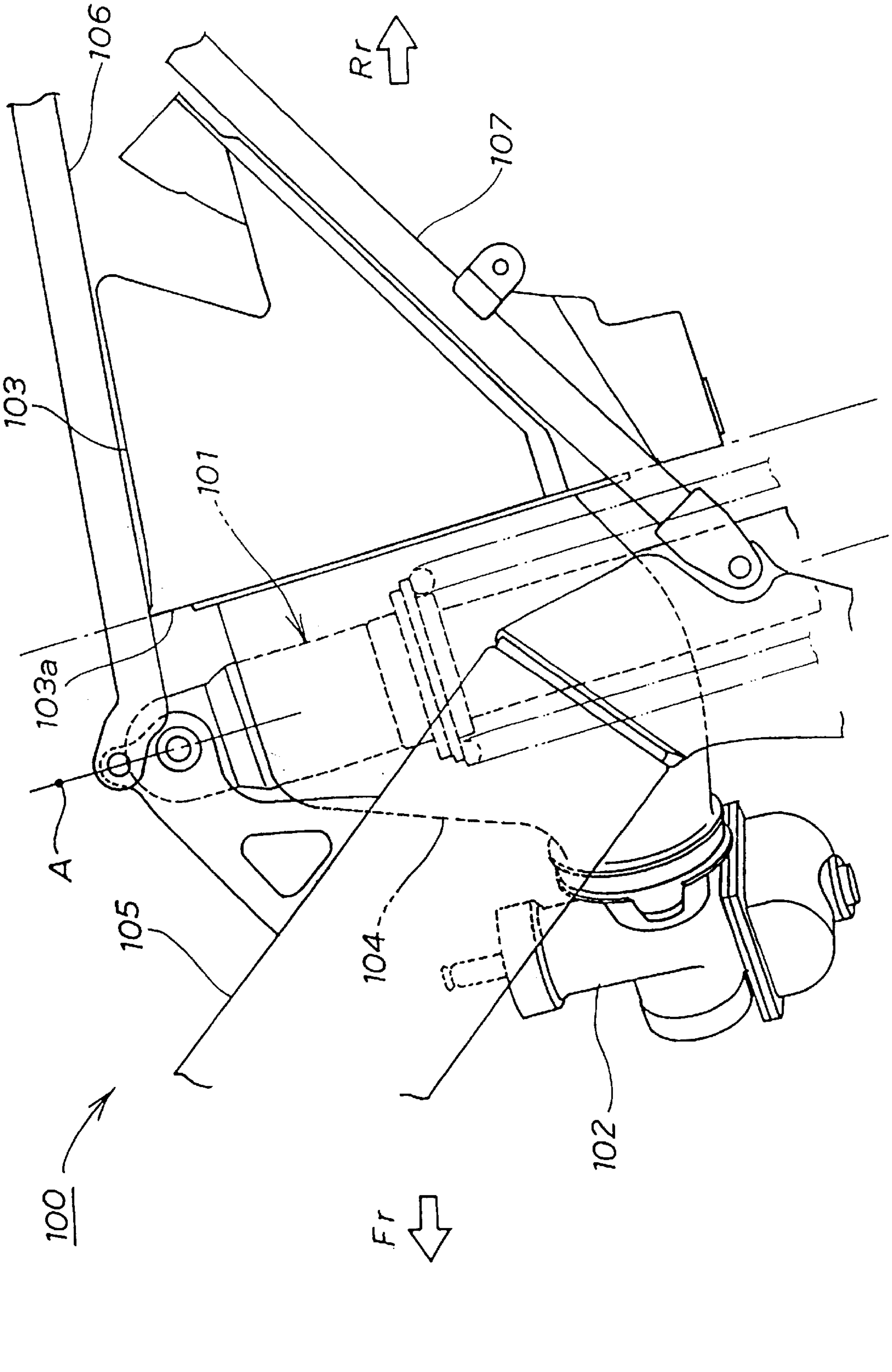
FIG. 6 is a side elevational view of a conventional an air cleaner system.

FIG. 3 is a side elevation of a connecting tube of an air cleaner system according to the present invention. FIG. 4 is a cross section along line 4—4 in FIG. 3.

The connecting tube 54 is a tube linking the carburetor 52 shown in FIG. 2 with the air cleaner 53, and is formed of air cleaner connecting port 61 on an air inlet side, and a carburetor connection port 62 on an air outlet side. The connecting ports 61 and 62 are linked by a body section 63. The connecting tube 54 has a recessed section 64 for housing the rear suspension damper 51 provided in the body section 63, and an expanded section 65 contributing to the capacity of the air cleaner 53 is also provided in the body section 63. Reference numeral 63*a* represents a plurality of reinforcement ribs formed on the body section 63.

Operation of the air cleaner system 50 described above will now be described.

FIG. 5(*a*) and FIG. 5(*b*) illustrate the operation of the present invention. FIG. 5(*a*) shows a comparative example, while FIG. 5(*b*) shows an embodiment of the present invention. Reference numeral 51*a* represents a rear suspension damper moved backwards when fully compressed, and reference numeral 51*b* represents the rear suspension damper moved forwards when fully expanded.

In FIG. 5(*a*), the connecting tube 110 shown in the comparative example is a tube linking the carburetor 52 with the air cleaner 53, and has an air cleaner connection port 111 formed on an air inlet side, and a carburetor connection port 112 formed on an air outlet side, with these connection ports joined together with a body section 113. There are no sections in the connecting tube 110 that can be expected to increase the capacity of the air cleaner 53.

In FIG. 5(*b*), the connecting tube 54 shown in the embodiment has a recessed section 64 provided in the body section 63 for housing the rear suspension damper, and an expanded section that contributes to the effective capacity of the air cleaner 53 provided in the body section 63. In other words, the recessed section 64 is provided so as to extend into the air cleaner 53, beyond the front surface 53*a* of the air cleaner 53, and the expanded section 65 is provided in the body section 63 so that the rear suspension damper 51 does not interfere with the air cleaner 53. The connecting tube 54 includes an engagement ring 70 that engages the air cleaner 53 at a corresponding engagement surface 71, the interaction of the engagement ring 70 and the engagement surface 71 occurring essentially in an engagement plane. The recessed portion of the connecting tube extends through engagement plane. Accordingly, it is possible to increase the effective capacity of the air cleaner 53 and to improve the output of the engine 19 (refer also to FIG. 1).

By providing the recessed section 64 for housing the rear suspension damper, the front surface 53*a* of the air cleaner 53 is brought closer to the rear suspension damper 51, and it is possible to shorten the effective distance between the air cleaner 53 and the engine 19 (refer to FIG. 1), improving engine performance.

In the embodiment, as shown in FIG. 2, the recessed section 64 for housing the rear suspension damper 51 is provided, and the front surface 53*a* of the air cleaner 53 is caused to slope forwards relative to the rear suspension damper, but it is also possible to cause the front surface 53*a* of the air cleaner 53 to be close to the rear suspension damper 51 by providing the recessed section 54 for housing the rear suspension damper 51 in the connecting tube 54.

The invention being thus described, it will be obvious that the same may be varied in many ways. Such variations are not to be regarded as a departure from the spirit and scope of the invention, and all such modifications as would be obvious to one skilled in the art are intented to be included within the scope of the following claims.

What is claimed is:

1. A motorcycle air cleaner system for use on a motorcycle having a single rear suspension damper arranged proximate a center of the motorcycle body, the rear suspension damper being movable towards a rear of the motorcycle when compressed, the system comprising:

an air cleaner mountable behind a rear suspension damper; and a connecting tube having a first end connectable to a front surface of the air cleaner, and a second end operably connectable to a carburetor, wherein the connecting tube includes a recessed section providing clearance for the rear suspension damper, the recessed section is formed behind the rear suspension damper and in front of the air cleaner, wherein when the first end of the connecting tube is connected to the air cleaner, the front surface of the air cleaner is located in front of a back end of the recessed section.

2. The motorcycle air cleaner system of claim 1, wherein the connecting tube includes an expanded portion, the expanded portion extending away from the air cleaner when the connecting tube is connected to the air cleaner.

3. The motorcycle air cleaner system of claim 1, wherein the first end of the connecting tube includes an engagement ring engageable with an engagement surface of the front surface of the air cleaner.

4. The motorcycle air cleaner system of claim 3, wherein when the engagement ring is engaged with the engagement surface, the ring and the surface engage essentially at a plane, a portion of the recessed section extending through said plane.

5. The motorcycle air cleaner system of claim 3, wherein the connecting tube includes an expanded portion, the expanded portion extending away from the air cleaner when the connecting tube is connected to the air cleaner, and being adjacent to the engagement ring.

6. The motorcycle air cleaner system of claim 1, wherein the recessed section is concave.

7. A motorcycle comprising:

a body, the body including a frame, a seat, and a rear suspension, the rear suspension including a rear suspension damper having a first end connected to the frame and a second end linked to a swing arm of the rear suspension, the rear suspension damper extending downwardly and rearwardly from its first end to its second end;

a handlebar connected to a front fork for steering the motorcycle;

a front wheel connected to the front fork;

a rear wheel connected to the rear suspension;

an engine mounted on the frame, the engine including a carburetor;

an air cleaner system, the air cleaner system including an air cleaner and a connecting tube, a first end of the connecting tube being connected to a front surface of the air cleaner so that the air cleaner is in fluid communication with the carburetor, wherein the connecting tube includes a recessed section, the recessed section providing clearance for the rear suspension damper when the rear suspension damper moves forward and backward along a longitudinal axial direction of the motorcycle, wherein the recessed section is formed behind the rear suspension damper and in front of the air cleaner.

8. The motorcycle of claim 7, wherein when the rear suspension damper is in a fully compressed state, a portion of the rear suspension damper extends into the recessed section.

9. The motorcycle of claim 7, wherein the front surface of the air cleaner extends generally parallel to the rear suspension damper.

10. The motorcycle of claim 7, wherein the recessed section is concave.

11. The motorcycle of claim 7, wherein a portion of the recessed section extends into an interior of the air cleaner.

12. The motorcycle of claim 7, wherein the connecting tube includes an expanded portion, the expanded portion extending away from the air cleaner.

13. The motorcycle of claim 7, wherein the first end of the connecting tube includes an engagement ring engageable with an engagement surface of the front surface of the air cleaner.

14. The motorcycle of claim 13, wherein when the engagement ring is engaged with the engagement surface, the ring and the surface engage essentially at a plane, a portion of the recessed section extending through said plane.

15. The motorcycle of claim 13, wherein the connecting tube includes an expanded portion, the expanded portion extending away from the air cleaner and being adjacent to the engagement ring.

16. The motorcycle of claim 7, wherein when the first end of the connecting tube is connected to the air cleaner, the front surface of the air cleaner is located in front of a back end of the recessed section.

* * * * *